US012138652B2

(12) United States Patent
Wolf et al.

(10) Patent No.: US 12,138,652 B2
(45) Date of Patent: Nov. 12, 2024

(54) APPLICATION DEVICE AND METHOD FOR PRODUCING AN APPLICATION DEVICE

(71) Applicant: Henkel AG & Co. KGaA, Duesseldorf (DE)

(72) Inventors: Karsten Wolf, Duesseldorf (DE); Peter Rushe, Duesseldorf (DE); Kai Ruthe-Steinsiek, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 18/297,170

(22) Filed: Apr. 7, 2023

(65) Prior Publication Data

US 2023/0338983 A1 Oct. 26, 2023

Related U.S. Application Data

(63) Continuation of application No. PCT/EP2021/076935, filed on Sep. 30, 2021.

(30) Foreign Application Priority Data

Oct. 13, 2020 (EP) .................................... 20201502

(51) Int. Cl.
*B05C 17/005* (2006.01)
*E04F 21/165* (2006.01)

(52) U.S. Cl.
CPC .. *B05C 17/00516* (2013.01); *B05C 17/00579* (2013.01); *B05C 17/00583* (2013.01); *E04F 21/165* (2013.01)

(58) Field of Classification Search
CPC ........ B05C 17/00516; B05C 17/00579; B05C 17/00583; B05C 17/00503; B05C 17/005;
(Continued)

(56) References Cited

U.S. PATENT DOCUMENTS 5,033,647 A * 7/1991 Smith ................ B05B 11/0072 222/212
10,828,662 B2 11/2020 Wolf et al.

FOREIGN PATENT DOCUMENTS

CA 2049447 A1 3/1992
DE 202015106902 U1 1/2016
(Continued)

OTHER PUBLICATIONS

Written Opinion in PCT/EP2021/076935 Sep. 30, 2021.*

*Primary Examiner* — David J Walczak
(74) *Attorney, Agent, or Firm* — Mary K. Cameron

(57) ABSTRACT

An application device (1) for applying a viscous material onto a substrate and a method for producing the application device (1). The application device (1) includes a ventilation device having an insert (19), which is connected air-tightly to an inner container (3) in the region of a discharge opening (18). An annular gap is formed between the insert (19) and a neck region (6) of the outer casing (2), through which annular gap air can flow from outside into an intermediate space between the outer casing (2) and the inner container (3) and vice versa. The connection between an applicator (4) and the outer casing (2) is also permeable to air and the applicator (4) includes a sealing means (25) that seals off the inner volume of the inner container (3) in an air-tight and leak-proof manner from the intermediate space.

11 Claims, 4 Drawing Sheets

Figure 1:
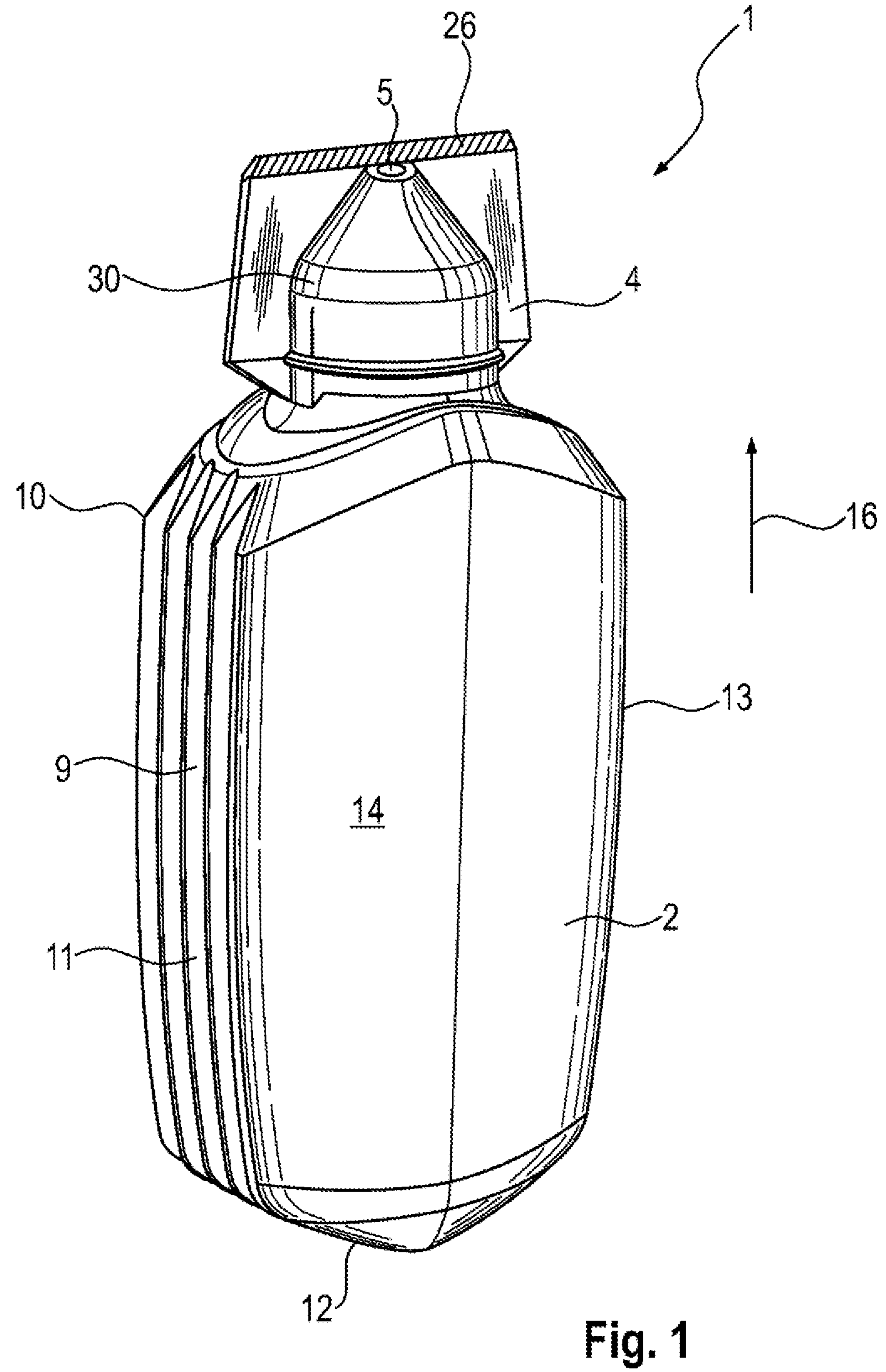

(58) Field of Classification Search
CPC . B05C 17/0052; E04F 21/165; E04F 21/1652
USPC ......................... 401/183–186, 261, 265, 266
See application file for complete search history.

(56) References Cited

FOREIGN PATENT DOCUMENTS

| | | | |
|---|---|---|---|
| EP | 3015383 | A1 | 5/2016 |
| WO | 02090211 | A1 | 11/2002 |
| WO | 2016166237 | A1 | 10/2016 |

* cited by examiner

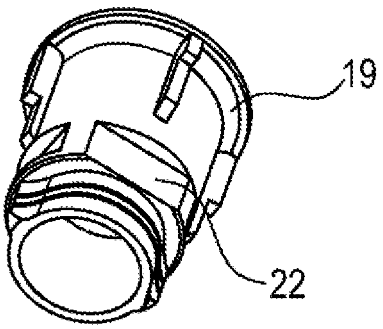
Fig. 8
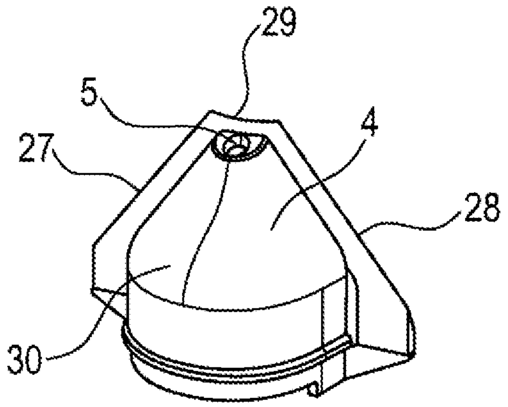
Fig. 10
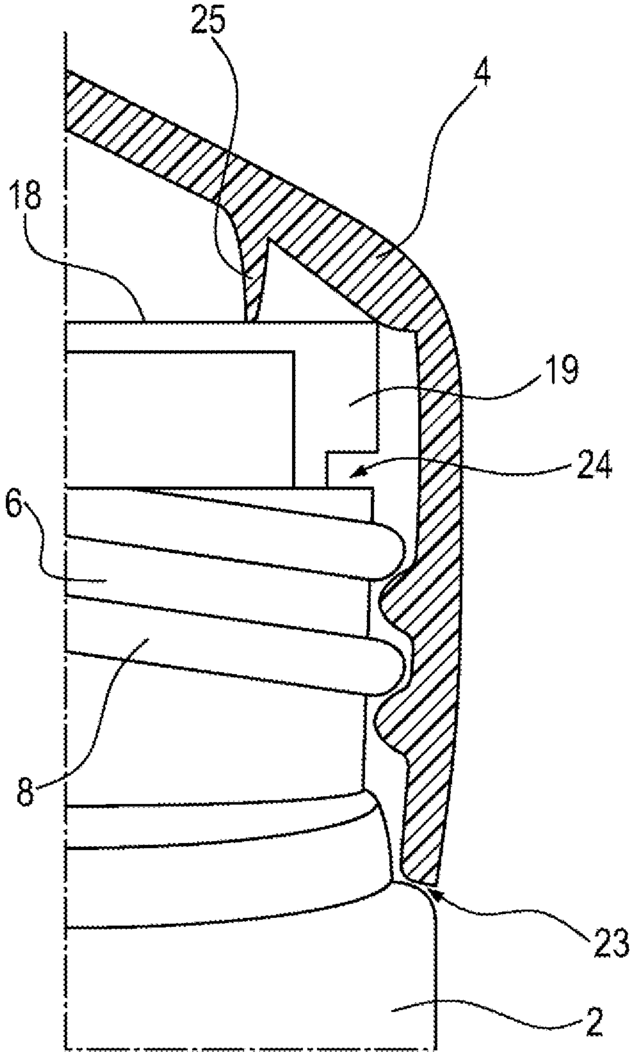
Fig. 9
Fig. 11
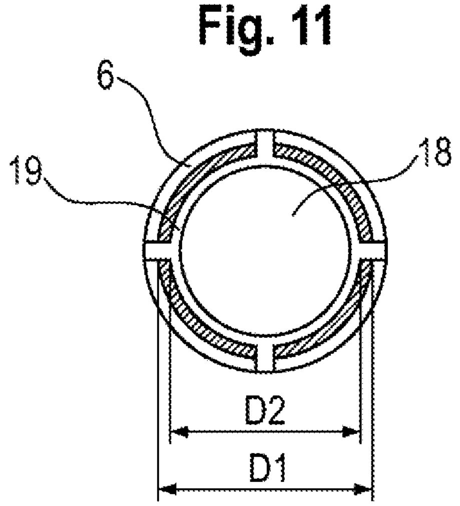

APPLICATION DEVICE AND METHOD FOR PRODUCING AN APPLICATION DEVICE

The invention relates to an application device for applying a viscous material to a substrate. The invention also relates to a method for producing such an application device.

Such application devices are known in the prior art as application tools and are used, for example, in industry, in crafts or in the DIY area. For example, such application devices can be used to dispense sealants to close joints between components in the sanitary area. Alternatively, adhesives or other viscous materials can be applied using such application devices.

An application device is known from WO2016/166237, which has a container for receiving a sealant and an applicator that can be placed on an opening of the container and latched to the container. The applicator has a dispensing opening for dispensing the sealant from the container onto a substrate and is also designed in such a manner that immediately after dispensing, on the one hand, the dispensed sealant is smoothed and, on the other hand, adjacent surface regions of the substrate are freed from excess sealant. In other words, the applicator is used for both dispensing and forming the sealant, as well as for subsequent cleaning of adjacent regions of the substrate. The sealant is dispensed from the container of the application device by squeezing the container wall by a user. A front and a rear actuating surface of the container are moved toward one another in such a manner as to cause a reduction in the internal volume of the container, thereby forcing the sealant into the applicator and dispensing it through the dispensing opening thereof. For this purpose, the actuating surfaces can be designed to be flexible or thin-walled in regions to allow and facilitate deformation of the container wall.

Such an application device has several disadvantages. Since many viscous materials have thixotropic behavior, it is usually necessary to agitate the application device before use to improve the flowability of the material and to convey it to the dispensing opening. Particularly for applications on vertically oriented substrates, this process may have to be repeated several times during the application to ensure the availability of the product at the dispensing opening. However, shaking introduces air into the material, which is disadvantageous for uniform and bubble-free discharge of the material. As soon as the pressure effect on the container subsides and the container wall returns to its original shape due to the restoring forces acting, a certain amount of viscous material may be drawn back into the application device due to the existing vacuum. In addition, air in particular is drawn into the container from the outside. This air escapes in an uncontrolled manner during subsequent dispensing procedures and/or may become trapped in the applied material. Such air pockets can impair the function of the applied material, for example a sealing function or an adhesive function, and the durability of the product is reduced by the penetration of air into the container.

Finally, due to the flexible but still comparatively solid material of the container wall, residual emptying of the container is hardly possible, i.e. considerable amounts of viscous material always remain in the container, which can no longer be discharged by compressing the container wall.

An application device is known from DE 20 2015 106 902 U1, which has a receiving container for a paste-like composition, a cap with a pouring spout, and a deformable wrapping surrounding the receiving container. The wrapping has a bellows-type fold, which promotes squeezing of the wrapping to discharge the pasty mass from the receiving container. This can result in improved residual drainage, but the problem of air intake and air pockets exists in equal measure here.

It is therefore the object of the present invention to provide an application device which overcomes the disadvantages of the prior art and which enables a viscous material to be dispensed from a container onto a substrate in a uniform and more complete manner in a simple manner. It is a further object of the invention to provide a method for producing such an application device.

These objects are solved by an application device having the features of claim 1 and by a method having the features of claim 10.

In accordance with claim 1, the invention proposes an application device for applying a viscous material to a substrate, comprising an inner casing having a dispensing opening for receiving the viscous material, an outer casing surrounding the inner casing and having a substantially hollow cylindrical neck region of an inner diameter D1 and an opening formed in the neck region, and an applicator connected to the outer casing, wherein the viscous material can be delivered from the inner casing into the applicator by pressure on the outer casing and applied to a substrate by the applicator. The application device according to the invention is characterized in that it comprises a ventilation device comprising an insert which is connected to the inner casing in an airtight manner in the region of the dispensing opening, which insert is substantially designed in the shape of a hollow cylinder and has an outer diameter D2, wherein the outer diameter D2 of the insert is smaller than the inner diameter D1 of the neck region of the outer casing, and wherein the insert has latching means on its outer side by means of which it is latched in the insert position within the neck region of the outer casing, in which insert position, due to the different diameters D1 and D2, an annular gap is designed between the insert and the neck region of the outer casing, through which air can flow from the outside into the intermediate space between the outer casing and the inner container and vice versa, and wherein furthermore the connection between the applicator and the outer casing is designed to be air-permeable and the applicator comprises a sealing means by which, in the use position of the applicator, an airtight and leak-proof sealing of the inner volume of the inner container with respect to the intermediate space between the outer casing and the inner container is provided.

In other words, the invention proposes to incorporate a ventilation device into the application device in such a manner that when the outer casing is compressed, air located between the outer casing and the inner container first exits through the annular gap between the neck region of the outer casing and the insert of the inner container and exits through the non-air-tight connection region between the applicator and the outer casing, such as a threaded connection. Pressure on the outer casing is transmitted to the inner casing, causing viscous material to be conveyed from the inner casing into the applicator and dispensed from the applicator onto a substrate. As soon as the pressure on the outer casing is released, air is drawn in again from outside through the connection region between the applicator and the outer casing into the intermediate space between the inner container and the outer casing in order to relieve the pressure built up here and return the outer casing to its original shape. At the same time, however, no air enters the inner casing storing the viscous material, since this is sealed off from the intermediate space between the outer casing and the inner casing by a sealant arranged in the applicator, for example a sealing ring, according to the invention. The outer casing thus resumes its original shape after each application procedure due to the inflow of air, while the inner container is further compressed and irreversibly deformed with each application procedure.

The integrated ventilation device prevents air from being drawn into the inner container storing the viscous material during metering and subsequent resetting of the outer casing. This eliminates the need to shake or "spike" the application device prior to use and ensures an air bubble-free application of the viscous material to a substrate. Since the inner container is further deformed with each application procedure and this deformation is not reversible, the viscous material cannot run back into regions of the inner container from which it would first have to be moved back towards the dispensing opening. Instead, the viscous material is always immediately available in any orientation of the application device, for example even in overhead applications, and can be dispensed reliably and without bubbles. This results in significantly improved residual emptying. The external appearance of the application device is thereby consistently attractive to a user, since the outer casing always returns to its original shape, while the increasingly deformed inner container is not visible to the user. In addition, the lack of air intake into the inner container also extends the durability of the viscous material.

The applicator acts as a metering and molding system and is connected to the outer casing. To connect the applicator and outer casing, the neck region of the outer casing may have an external thread and the applicator may have a corresponding internal thread. The threaded connection can be designed as a right-hand thread, but it can in particular also be designed as a left-hand thread to counteract accidental unscrewing of the applicator from the outer casing by a user. In any case, the threaded connection is designed to be permeable to air, thus allowing air to flow through the thread into the intermediate space between the inner container and outer casing, and vice versa. A sealant contained in the applicator seals the inner volume of the inner container from these air flows.

The application device according to the invention is equally suitable for the initial application of viscous material, for example sealing material, to a substrate, as well as for the subsequent application of material to an existing material layer that may be in need of repair.

In accordance with an embodiment of the invention, the annular gap designed between the insert of the inner container and the neck region of the outer casing has a gap width of 0.4 to 1 mm. This gap width results from half the difference between the inner diameter D1 of the neck region of the outer casing and the outer diameter D2 of the insert. Such a gap width ensures that air can quickly escape to the outside from the intermediate space between the outer casing and the inner container when the outer casing is compressed, and that air can just as quickly flow back into this intermediate space from the outside when the pressure on the outer casing is released. In this case, air is drawn into the intermediate space much faster than any slight retraction of the viscous material from the dispensing opening of the applicator, such that a pressure equilibrium has already been restored before the viscous material possibly retracts slightly from the dispensing opening of the applicator. In this manner, air can be prevented from entering the inner container.

The outer casing may have a bottle-like shape. In this regard, the cross-section of the outer casing may be substantially rectangular, in such a manner that a front and a rear actuating surface are designed to be moved toward one another for transmitting pressure to the inner container.

According to an embodiment of the invention, the outer casing has a lamella fold by which compression of the outer casing is facilitated. A bellows-type lamella fold promotes compression of the outer casing to discharge the viscous material from the inner container. In accordance with a preferred embodiment, the lamella fold is thereby designed in such a manner that compression of the outer casing occurs substantially in a direction perpendicular to a main flow direction of the viscous material. A main flow direction of the material is given by a direction from a rear end of the inner container towards the discharge opening located at an opposite end of the inner container. By folding regions of the outer casing in a direction parallel to this main flow direction, the outer casing can be easily compressed in a direction perpendicular to the main flow direction. In this manner, one-handed operation of the application device according to the invention is possible by a user holding the outer casing between the thumb and at least one further finger of the same hand and, by moving the thumb and the at least one further finger towards one another, compressing the outer casing, favored by the lamella fold, without great effort. The pressure exerted on the outer casing is transmitted to the inner container and the viscous material is conveyed into the applicator and dispensed from it onto a substrate. The good compressibility of the outer casing promotes good residual drainability.

The number of folds or lamellae can vary in principle, wherein a larger number of lamellae facilitates compression of the outer casing, but at the same time is associated with reduced strength and stability of the outer casing. In this respect, a compromise must be found between good compressibility on the one hand and sufficient stability of the outer casing on the other. In general, such a compromise is given with a number of 3 to 7 lamellas. The opening angle between two adjacent lamellas can be about 30°–55°.

In accordance with one embodiment of the invention, the inner container is designed as a film bag. A film bag is generally highly flexible and thus readily deformable, such that the pressure exerted over the outer casing can be easily and efficiently transmitted to the film bag and the viscous material stored therein. For example, the inner container may be designed from an aluminum-based film. The film material may be a laminate comprising at least one aluminum layer. Such materials also have sufficient stability and strength to prevent the film bag from tearing open and the viscous material from accidentally escaping into the intermediate space between the inner container and the outer casing, even when forces are applied, such as when the application device falls to the ground from a certain height. This is all the more important because a user would not be immediately aware of a leak in the film bag due to the outer casing surrounding the film bag. Finally, an aluminum laminate has the advantage of being largely impervious to moisture. In this manner, water can be prevented from diffusing from the viscous material through the bag wall and the viscous material can be prevented from curing while still in the application device. This gives the product a significantly improved storability. An exemplary laminate is constructed as a four-layer composite consisting of a PET layer, an aluminum layer, an OPA layer and a PE layer.

An embodiment of the invention provides that the inner container is connected to the insert by welding, wherein the welded connection has a pressure tightness up to at least 1,5 bar. The connection between the application device and the inner container is thus designed to withstand forces such as those that occur when the application device falls to the ground from a certain height, thus preventing the application device from detaching from the inner container and the viscous material from escaping into the intermediate space between the inner container and the outer casing. The insert itself may be produced from a thermoplastic, for example, using an injection molding process.

In an embodiment of the invention, the applicator comprises a main body and means for smoothing the applied viscous material and/or means for cleaning adjacent substrate regions. For this purpose, a delta-shaped wing can be formed on the main body of the applicator, the outer edges of which serve for smoothing the applied material and cleaning adjacent substrate regions. The applicator may also comprise a substantially rectangularly designed blade having at least one smoothing or cleaning edge. In this regard, it may be provided that the applicator has at least two materials of different stiffness, wherein the main body is made of a stiffer material than the means for smoothing and/or the means for cleaning. For example, the outer edges of the blade used for smoothing and/or cleaning can be made of a pliable material, while the main body of the applicator is made of a stiff material, such as a thermoplastic elastomer. With an applicator designed in this manner, the viscous material can be dispensed and formed in one operation by applying pressure to the outer casing and simultaneously pulling the application device over the substrate, and excess material can be pulled off the substrate and collected.

The invention also relates to a method for producing an application device according to one of claims 1 to 9, comprising the following steps:

- providing an inner container and an insert connected to the inner container, an outer casing having a neck region and an opening, and an applicator;
- U-shaped folding of the inner container by directly superimposing a left flank of the inner container and a right flank of the inner container;
- inserting the U-shaped folded inner container through the opening in the outer casing;
- latching the insert of the inner container to the neck region of the outer casing, forming an annular gap between the insert of the inner container and the neck region of the outer casing;
- filling the inner container with the viscous material;
- applying the applicator to the outer casing and joining the applicator and the outer casing, wherein the joining of the applicator and the outer casing is air-permeable while the applicator seals the intermediate space between the outer casing and the inner container from the inner volume of the inner container;
- if necessary, placing a protective cap on the applicator and latching the protective cap to the outer casing.

In order to insert the inner container into the outer casing, it is necessary to fold the inner container. By filling the inner container with the viscous material, the inner container is finally unfolded again inside the outer casing. Essential to the method according to the invention is the U-shaped folding of the inner container, for example of a film bag, in which a right flank of the inner container and a left flank of the inner container are placed directly one above the other. This distinguishes the U-shaped fold from a so-called Z-shaped fold, in which one lateral flank of the inner container is folded over to the front, while the other lateral flank is folded over to the rear. Compared to a Z-shaped fold, a U-shaped fold has the advantage of a significantly improved and more reliable unfolding of the inner container when filled with the viscous material, thus enabling a more uniform and complete filling of the inner container.

In accordance with an embodiment of the method, the outer casing of the application device can be manufactured from a thermoplastic elastomer in an injection blow molding process. A combined injection blow molding process is particularly suitable for forming an outer casing with a lamella fold.

Figure 2:
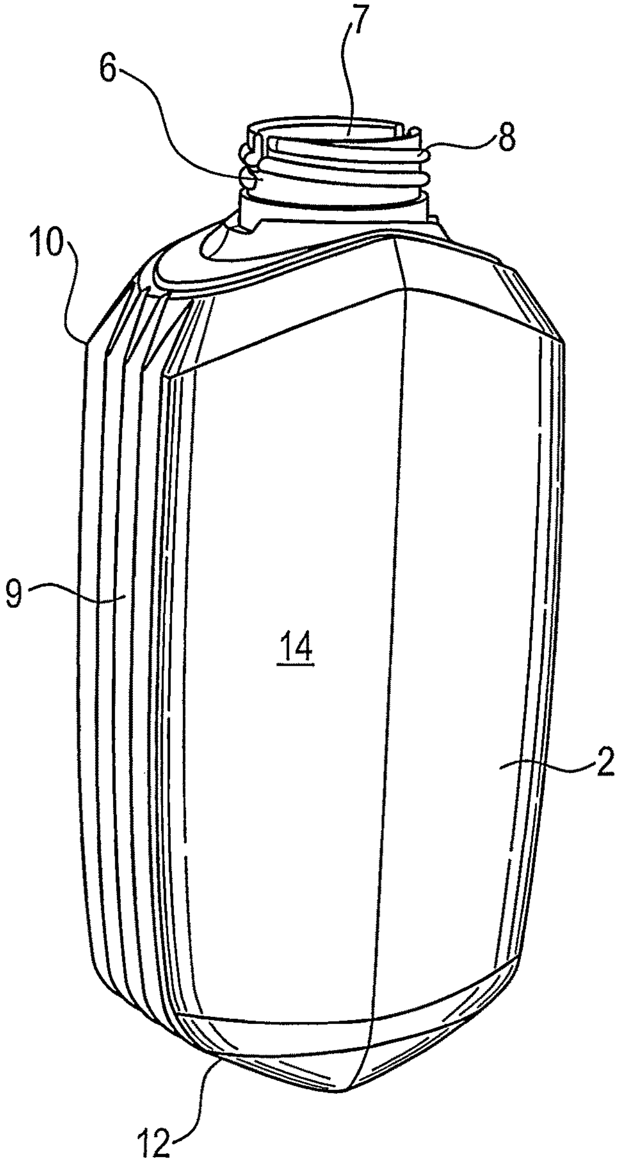
Figure 3:
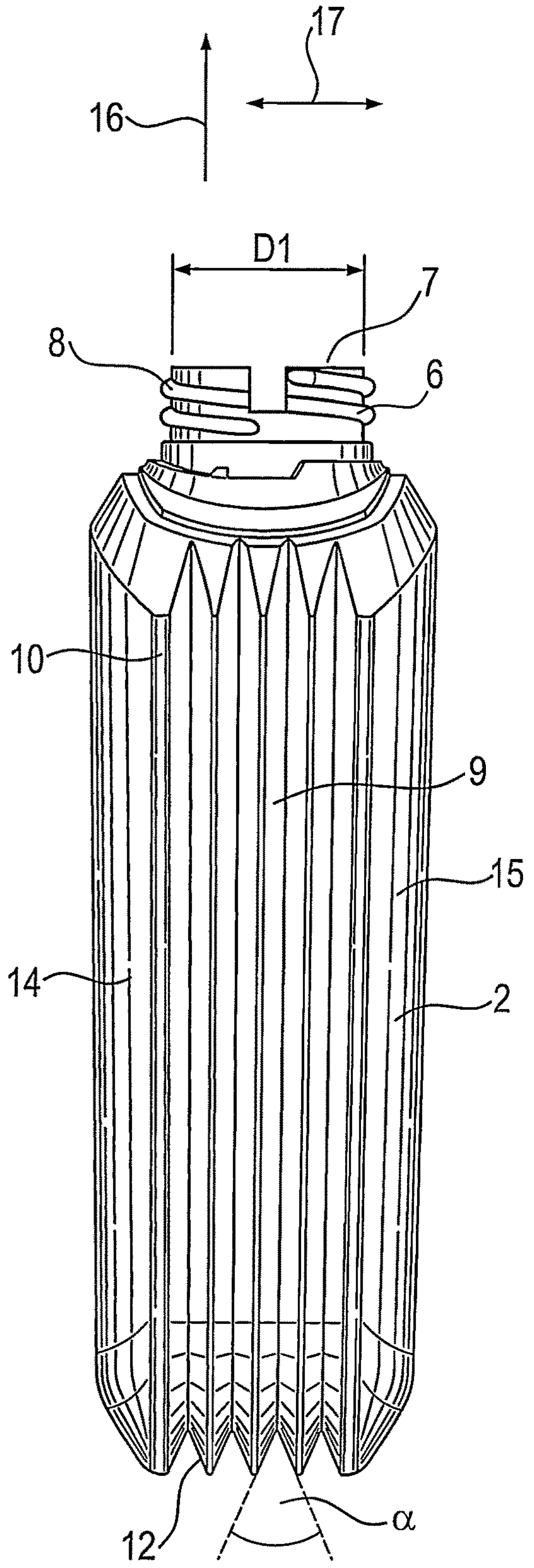
Figure 4:
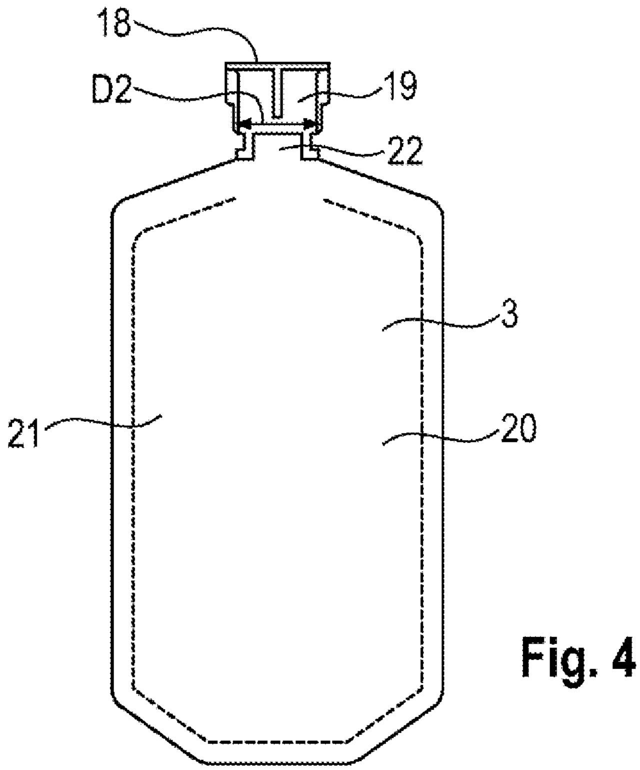
Figure 5:
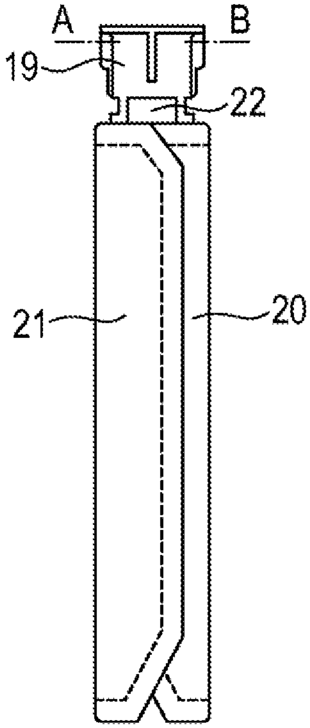
Figure 6:
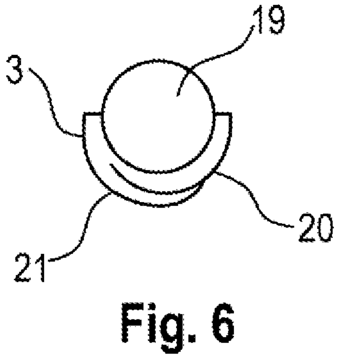
Figure 7:
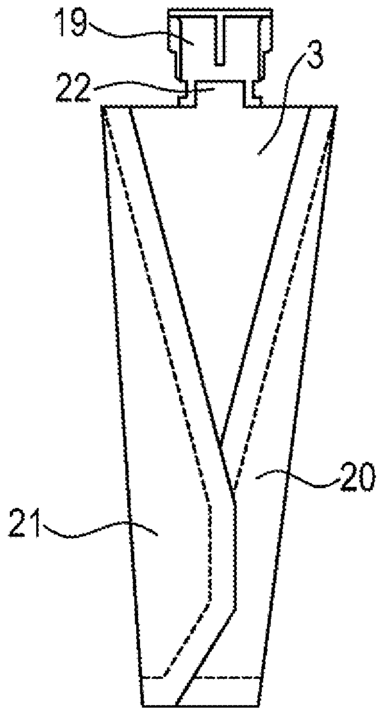

In the following, the invention is explained in more detail by means of embodiment examples and with reference to the attached figures. In the drawings:

FIG. 1: shows an embodiment of an application device according to the invention in a perspective view;

FIG. 2: shows the outer casing of the application device of FIG. 1;

FIG. 3: shows a side view of the outer casing shown in FIG. 2;

FIG. 4: shows an inner container of the application device with an insert;

FIG. 5: shows the inner container of FIG. 4 folded in a U-shape;

FIG. 6: shows a view of the inner container folded in a U-shape from above;

FIG. 7: shows the inner container of FIG. 5 in an already partially unfolded state;

FIG. 8: shows an example of an insert in an oblique view from below;

FIG. 9: shows a schematic diagram of the connection region of the applicator, insert and outer casing;

FIG. 10: shows an alternative embodiment of the applicator in a perspective view;

FIG. 11: shows a schematic sectional view of the insert latched in the neck region of the outer casing, forming an annular gap.

FIG. 1 shows an application device, designated 1 in its entirety, for applying a viscous material to a substrate. The application device 1 comprises an outer casing 2 and an inner container 3, which is not visible in the illustration of FIG. 1, is arranged inside the outer casing 2 and stores the viscous material, for example a sealant. The inner container 3 will be explained in more detail later in connection with FIGS. 4-7.

Furthermore, the application device 1 comprises an applicator 4, which is connected to the outer casing 2 via a threaded connection. The threaded connection between applicator 4 and outer casing 2 is designed to be air-permeable. An external pressure exerted on the outer casing 2 is transmitted to the inner container 3, causing the viscous material to be conveyed from the inner container 3 into the applicator 4 and then to be applied to a substrate. For this purpose, the applicator 4 has a dispensing opening 5 through which the viscous material can exit the application device 1.

FIGS. 2 and 3 show two views of the outer casing 2 of the application device 1 of FIG. 1. The outer casing 2 comprises a neck region 6 having an opening 7, wherein the neck region 6 is substantially designed as a hollow cylinder and has an inner diameter D1. The neck region 6 is provided with an external thread 8, which serves to screw the outer casing 2 to the applicator 4 of the application device 1. The external thread 8 is designed as a left-hand thread.

The outer casing 2 has a lamella fold 9 in the manner of a bellows, wherein the lamellae 10 extend circumferentially, starting from a region below the neck region 6 of the outer casing 2, over the left side 11 of the outer casing 2, over its underside 12 and over the right side 13, in turn up to the neck region 6. The lamella fold 9 facilitates the compression of the outer casing 2. For this purpose, a user can grasp the outer casing 2 with one hand between the thumb and at least one other finger and apply pressure to the two opposing actuating surfaces 14 and 15 in such a manner that the two actuating surfaces 14 and 15 are moved towards one another.

In this regard, the lamella fold 9 is designed in such a manner that compression of the outer casing 2 occurs substantially in a direction perpendicular to a main flow direction of the viscous material within the application device 1. A main flow direction of the viscous material is shown in FIGS. 1 and 3 by the arrow 16 and extends from the bottom 12 of the outer casing 2 towards the applicator 4 and the opening 7, respectively. In FIG. 3, the perpendicular direction in which the compression of the outer casing 2 takes place is also indicated by the arrow 17. The embodiment shown has five lamellas, wherein the opening angle $\alpha$ between two adjacent lamellas is about 47°.

FIG. 4 shows an inner container 3 of the application device 2. The inner container 3 is designed as a film bag made of an aluminum laminate with a film thickness of about 100 μm by edge sealing. The inner container 3 is used to store the viscous material and has a dispensing opening 18. In the region of the dispensing opening 18, an insert 19 is connected to the inner container 3 in an airtight manner by welding. The insert 19 is substantially designed in the shape of a hollow cylinder, which can be seen more clearly in FIG. 6 and in FIG. 11. The outer diameter D2 of insert 19 is smaller than the inner diameter D1 of neck region 6 of outer casing 2, see also FIG. 11. The insert 19 is part of a ventilation device, which will be explained in more detail below.

In the application device 1 of FIG. 1, the inner container 3 is arranged inside the outer casing 2. For insertion into the outer casing 2, the inner container 3 is folded in a U-shape, which can be seen in FIGS. 5 and 6. For this purpose, the right flank 20 is first folded onto the central region of the inner container 3 and then the left flank 21 of the inner container 3 is placed directly over it. FIG. 6 shows a top view of the arrangement of the flanks 20 and 21 of the inner container 3 in the U-shaped folded state. In this state, the inner container 3 can be inserted through the opening 7 into the inner region of the outer casing 2. Subsequent filling of the inner container 3 with the viscous material through the opening 18 causes the inner container 3 to gradually unfold, wherein an upper region of the inner container 3 unfolds first, which is indicated in FIG. 7, before the lower region of the inner container 3 also unfolds completely upon further filling. Compared to other types of folding, the U-shaped folding results in a particularly reliable unfolding of the inner container 3, enabling a more uniform and complete filling with viscous material.

The inner container 3 inserted into the outer casing 2 is connected to the outer casing 2 by a latching mechanism. For this purpose, the insert 19 connected to the inner container 2 has latching means 22 on its outer side, cf. also FIG. 8, which, in the insertion position of the inner container 3 in the outer casing 2, latch with corresponding latching means on the inner side of the neck region 6 of the outer casing 2. Due to the difference between the outer diameter D2 of the insert 19 and the inner diameter D1 of the neck region 6, an annular gap is designed between the insert 19 and the neck region 6 of the outer casing 2 in the insert position of the insert 19, see FIG. 11. FIG. 11 shows a top view of a section through the insert 19 along the line A-B indicated in FIG. 5, wherein the insert 19 is inserted into the neck region 6 of the outer casing 2. The annular gap is shown here by a shaded region, though not to scale. Air can flow through this annular gap into the intermediate space between the outer casing 2 and the inner container 3 and vice versa. In the embodiment shown, the diameter D1 is about 19.3 mm and the diameter D2 is about 17.8 mm. The annular gap thus has a gap width of about 0.75 mm.

FIG. 9 shows a section of the connection region of applicator 4, insert 19 and neck region 6 of outer casing 2 in schematic, partially cutaway view. The threaded connection between the applicator 4 and the neck region 6 of the outer casing 2 is permeable to air, allowing air to flow into and through the threaded connection region from the outside in the direction indicated by the arrow 23, and finally to flow into the intermediate space between the inner container 3 and the outer casing 2 through the annular gap between the insert 19 and the neck region 6 of the outer casing 2 in the region indicated by the arrow 24. At the same time, the applicator 4 has a sealing means 25 by which the inner volume of the inner container 3, which is accessible via the dispensing opening 18, is sealed with respect to the intermediate space between the outer casing 2 and the inner container 3. In other words, air can flow into the intermediate space between outer casing 2 and inner container 3, but this air cannot flow into inner container 3.

This ventilation device ensures bubble-free, uniform discharge of the viscous material from the application device 1. When the outer casing 2 is compressed by a user in the manner described above, air located between the outer casing 2 and the inner container 3 first escapes through the annular gap between the neck region 6 of the outer casing 2 and the insert 19 of the inner container 3 and passes to the outside through the air-permeable threaded connection between the applicator 4 and the outer casing 2. Pressure on the outer casing 2 is transmitted to the inner casing 3, causing viscous material to be conveyed from the inner casing 3 into the applicator 4 and dispensed through its dispensing opening 5 onto a substrate. As soon as the pressure on the outer casing 2 is released, air is drawn in again from outside through the connection region between the applicator 4 and the outer casing 2 into the intermediate space between the inner container 3 and the outer casing 2 in order to relieve the negative pressure built up here and to return the outer casing 2 to its original shape. At the same time, however, no air enters the inner container 3 storing the viscous material, since this is sealed off from the intermediate space between the outer casing 2 and the inner container 3 by the sealing means 25 arranged on the applicator 4. The outer casing 2 thus resumes its original shape after each application procedure due to the inflow of air, while the inner container 3 is further compressed and irreversibly deformed with each application procedure.

The integrated ventilation device prevents air from being drawn into the inner container 3toring the viscous material during metering and subsequent resetting of the outer casing 2 This eliminates the need to shake or "spike" the application device 1 prior to use and ensures an air bubble-free application of the viscous material to a substrate. Since the inner container 3 is further deformed with each application procedure and this deformation is not reversible, the viscous material cannot run back into regions of the inner container 3 from which it would first have to be moved back towards the dispensing opening 18. Rather, the viscous material is always immediately available in any orientation of the application device 1 and can be dispensed reliably and without bubbles. This also achieves significantly improved residual emptying. The external appearance of the application device 1 is thereby consistently attractive to a user, since the outer casing 2 always returns to its original shape, while the increasingly deformed inner container 3 is not visible to the user.

FIG. 10 shows an alternative embodiment of an applicator 4. Compared to the substantially rectangular shape of the applicator 4 in FIG. 1, the applicator 4 in FIG. 10 is designed in a delta shape. The outer edges 26, 27, 28, 29 of the applicators 4 of FIGS. 1 and 4 serve as means for smoothing the applied viscous material and as means for cleaning adjacent substrate regions, respectively. In this case, the main body 30 of the applicator 4 is made of a more rigid material than the means for smoothing and cleaning, which are made of a pliable material.

The invention claimed is:

1. An application device for applying a viscous material to a substrate, comprising:

an inner container having a dispensing opening for receiving the viscous material, an outer casing surrounding the inner container and having a substantially hollow-cylindrical neck region of an inner diameter D1 and an opening designed in the neck region, and an applicator connected to the outer casing, wherein the viscous material can be conveyed from the inner container into the applicator by pressure on the outer casing and the viscous material can be applied to a substrate by the applicator, wherein the application device has a ventilation device comprising an insert which is connected in an airtight manner to the inner container in a region of the dispensing opening and which is in a shape of a hollow cylinder and has an outer diameter D2, wherein the outer diameter D2 of the insert is smaller than the inner diameter D1 of the neck region of the outer casing, and wherein the insert has latching means on an outer side by which the insert is latched in an insert position within the neck region of the outer casing, wherein in this insert position, due to the different diameters D1 and D2, an annular gap is designed between the insert and the neck region of the outer casing, through which air can flow from outside into an intermediate space between the outer casing and the inner container and vice versa, and wherein a connection between the applicator and the outer casing is designed to be air-permeable and the applicator comprises a sealing means by which, in a use position of the applicator, an airtight and leak-proof sealing of an inner volume of the inner container with respect to the intermediate space between the outer casing and the inner container is provided.

2. The application device of claim 1, wherein the annular gap has a gap width of 0.4 to 1 mm.

3. The application device of claim 1, wherein the outer casing has a lamella fold by which compression of the outer casing is facilitated.

4. The application device of claim 3, wherein the lamella fold is positioned so that a compression of the outer casing occurs in a direction perpendicular to a main flow direction of the viscous material.

5. The application device of claim 1, wherein the inner container is a film bag.

6. The application device of claim 5, wherein the inner container is a multilayer laminate comprising an aluminum film.

7. The application device of claim 1, wherein the inner container is connected to the insert by welding, and the welded connection has a pressure tightness up to at least 1.5 bar.

8. The application device of claim 1, wherein the applicator comprises a main body and means for smoothing the applied viscous material and/or means for cleaning adjacent substrate regions.

9. The application device according to claim 8, wherein the applicator has at least two materials of different stiffness, and the main body is made of a stiffer material than the means for smoothing and/or the means for cleaning.

10. A method for producing the application device of claim 2, comprising:

providing the inner container and the insert connected to the inner container, the outer casing having the neck region and an opening, and the applicator;

U-shaped folding of the inner container by directly superimposing a left flank of the inner container and a right flank of the inner container;

inserting the U-shaped folded inner container through the opening in the outer casing;

latching the insert of the inner container to the neck region of the outer casing, forming an annular gap between the insert of the inner container and the neck region of the outer casing;

filling the inner container with the viscous material;

applying the applicator to the outer casing and joining the applicator and the outer casing, wherein the joining of the applicator and the outer casing is air-permeable while the applicator seals the intermediate space between the outer casing and the inner container from the inner volume of the inner container;

optionally, placing a protective cap on the applicator and latching the protective cap to the outer casing.

11. The method according to claim 10, wherein the outer casing is manufactured from a thermoplastic elastomer in an injection blow molding process.

* * * * *